United States Patent
Zakharov et al.

[11] Patent Number: 6,131,544
[45] Date of Patent: Oct. 17, 2000

[54] CONNECTING-ROD AND PISTON ASSEMBLY

[76] Inventors: Evgeny Nikolaevich Zakharov, kv. 127, d.15, korp. 3, ul. Straobitevskaya, Moscow, 113628; Genya Tyo, kv. 4, d14, per. Ogorodnaya Sloboda, Moscow, 101000, both of Russian Federation

[21] Appl. No.: 09/202,375
[22] PCT Filed: Jun. 11, 1997
[86] PCT No.: PCT/RU97/00189
 § 371 Date: Dec. 11, 1998
 § 102(e) Date: Dec. 11, 1998
[87] PCT Pub. No.: WO97/47871
 PCT Pub. Date: Dec. 18, 1997
[51] Int. Cl.[7] .......................... F02B 75/32; F02F 3/00
[52] U.S. Cl. ........................ 123/197.3; 123/197.1; 123/197.2; 123/193.6
[58] Field of Search .............. 123/197.1, 197.2, 123/197.3, 193.6

[56] References Cited

U.S. PATENT DOCUMENTS

| | | | |
|---|---|---|---|
| 5,092,290 | 3/1992 | Bartkowicz | 123/193.6 |
| 5,651,304 | 7/1997 | Allsop | 1223/197.3 |

FOREIGN PATENT DOCUMENTS

| | | | |
|---|---|---|---|
| 58-65951 | 4/1983 | Japan | 123/193.6 |
| 58-106154 | 6/1983 | Japan | 123/193.6 |
| 1523700 | 11/1989 | Russian Federation . | |
| 1043021A | 9/1966 | United Kingdom . | |
| 1192555 | 5/1970 | United Kingdom . | |
| 1237963 | 7/1971 | United Kingdom . | |
| 2 163 520 | 2/1986 | United Kingdom . | |
| 2163520A | 2/1986 | United Kingdom . | |

*Primary Examiner*—Willis R. Wolfe
*Assistant Examiner*—Brian Hairston
*Attorney, Agent, or Firm*—Graybeal Jackson Haley LLP

[57] ABSTRACT

The present invention relates to a connecting rod and piston assembly that comprises a cylinder and a piston, the piston comprising a head, a skirt and a support element. The piston is attached to the connecting rod by a pin, the connecting rod being mounted on the central cylindrical part of the pin. The ends of the pin are made in the shape of cylindrical segments which are coaxial to the cylindrical part of the pin and have planar surfaces parallel to the pin longitudinal axis. Fixing plates lie against the planar surfaces of the pin ends. The plates comprise openings in which threaded members pull the pin ends toward cylindrical recesses in the support element, the ends and the support element being simultaneously pulled towards the head.

12 Claims, 3 Drawing Sheets

CONNECTING-ROD AND PISTON ASSEMBLY

FIELD OF THE INVENTION

The present invention relates to mechanical engineering, particularly to engine designs, and, more particularly, to a connecting rod and piston assembly for an internal combustion engine.

BACKGROUND OF THE INVENTION

In a conventional connecting rod and piston assembly, the piston having a crown, a skirt and mountings is connected to the connecting rod through a gudgeon pin. The connecting rod is installed on a central cylindrical portion of the gudgeon pin whose ends are received in holes provided in the mountings which are urged to the crown by threaded members (see GB, A1, 1 043 021).

A disadvantage of the conventional assembly is its relatively great weight and dimensions.

GB, A1, 2 163 520 discloses another conventional connecting rod and piston assembly for an internal combustion engine, which comprises a piston in a cylinder, the piston being constructed with a head portion, a skirt portion and a mounting member, and connected to the connecting rod via a gudgeon pin. The connecting rod is mounted on a central cylindrical portion of the gudgeon pin. The mounting member surface remote from the head is provided with recesses having open cylindrical surfaces for matching and locating the ends of the gudgeon pin, the ends being urged to the head by threaded members.

The above prior art, most closely approaching the present invention, also suffers great weight and dimensions and, consequently, a poor reliability.

SUMMARY OF THE INVENTION

Accordingly, it is an object of the present invention to provide a lighter weight connecting rod and piston assembly having lesser dimensions and improved reliability.

The object of the invention is attained by providing a connecting rod assembly which has fixing plates with openings in them, the ends of a piston pin being made in the shape of semi-cylindrical elements which are coaxial to the central cylindrical portion of the piston pin and have planar surfaces parallel to the longitudinal axis of the piston pin, the fixing plates lie against the planar surfaces of the piston pin ends and contact them, and threaded members are arranged within the openings in the fixing plates symmetrically about the piston pin axis.

The object of the invention is also attained by making a support member in the form of a carriage with Y-shaped bearings and rolling members disposed in the rocking plane of the connecting rod at both sides of the piston pin, the skirt having cutouts wherein the rolling members are mounted on shafts in the Y-shaped bearings so as to contact the cylinder wall.

At least one pair of rolling members can be mounted at one side of the piston pin.

The shafts of the pair of rolling members can be disposed in parallel.

A distance between rotation axes of the pair of rolling members can be less than a diameter of the rolling members.

One of the pair of rolling members can be provided with a radial annular recess to receive the other rolling member.

The connecting rod and piston assembly can be provided with embedded nuts, the head having radial grooves to receive the nuts into which the threaded members are screwed.

The radial grooves can be made in the form of an inner annular bore arranged in the plane parallel to the longitudinal axis of the piston pin, the nuts being made in the form of ring segments.

The larger diameter portion of the annular surface of the nuts can be arranged in the annular bore, while the other part thereof mates the support member surface and is urged thereto by the threaded members.

The head can be provided with a centering cylindrical bore of less diameter than the annular bore, the carriage, at the head side, having a centering flange mated with the cylindrical surface of the centering bore in the head.

The head can be provided, at the support member side, with blind holes receiving the threaded member ends protruding beyond the surface of the embedded nuts.

The diameter of the central cylindrical portion of the piston pin may exceed the diameter of the cylinder segments.

BRIEF DESCRIPTION OF THE DRAWINGS

These and other features and advantages of the present invention will be more clearly understood from the following detailed description of its embodiments taken in conjunction with accompanying drawings in which.

DESCRIPTION OF THE PREFERRED EMBODIMENT

Figure 1:
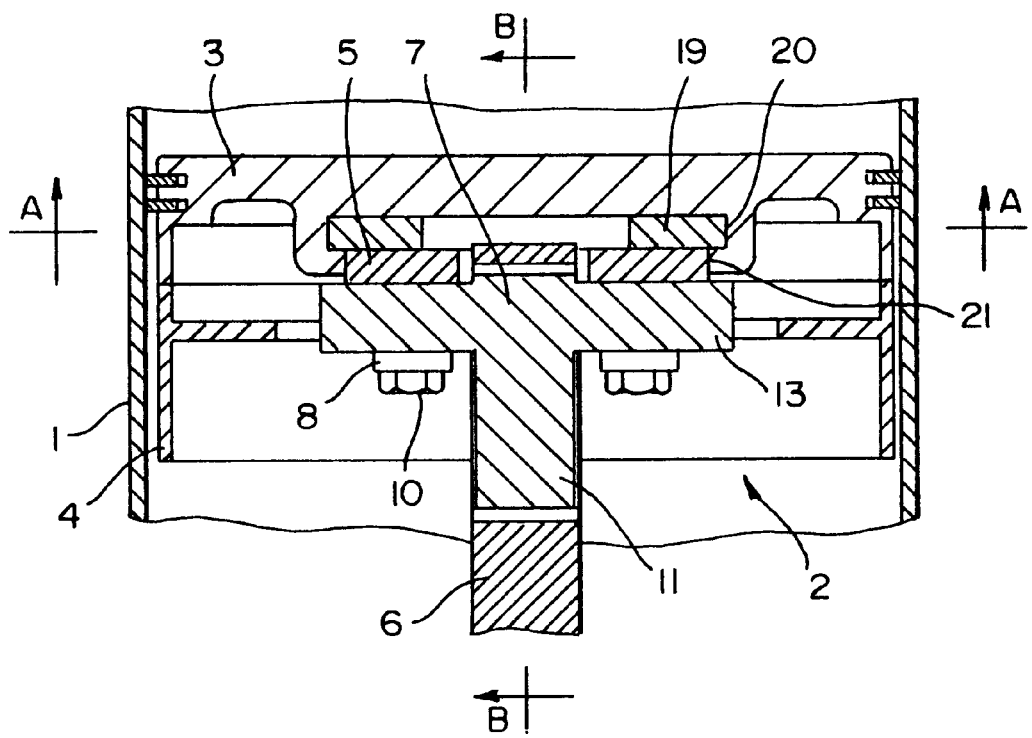
FIG. 1 illustrates a connecting rod and piston assembly in accordance with the present invention.
Figure 2:
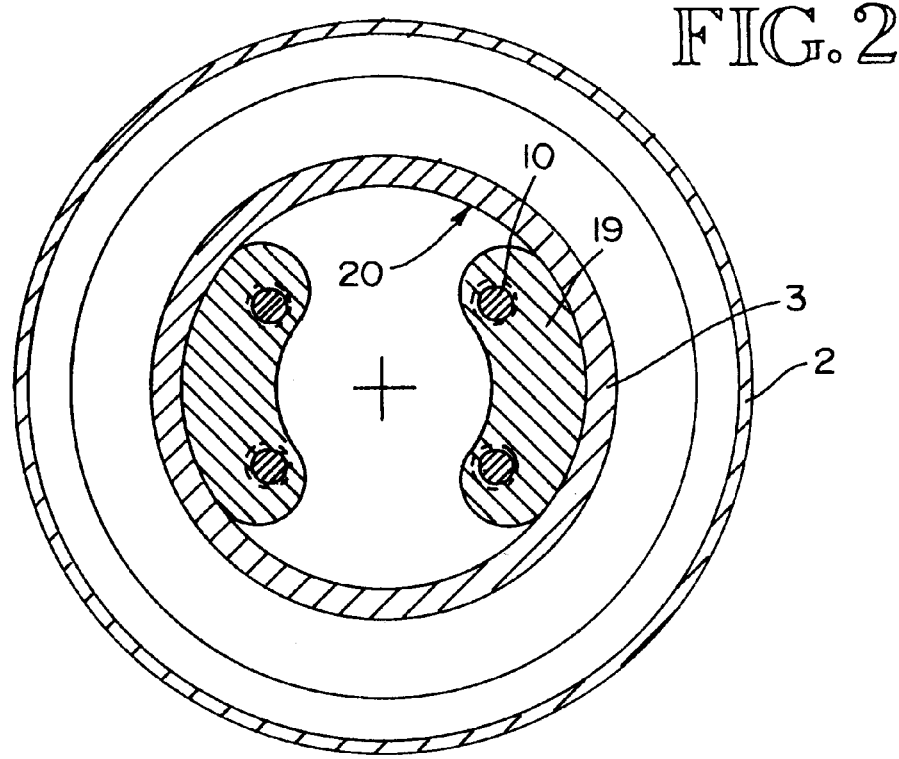
FIG. 2 is a sectional view taken through line A—A of FIG. 1.
Figure 3:
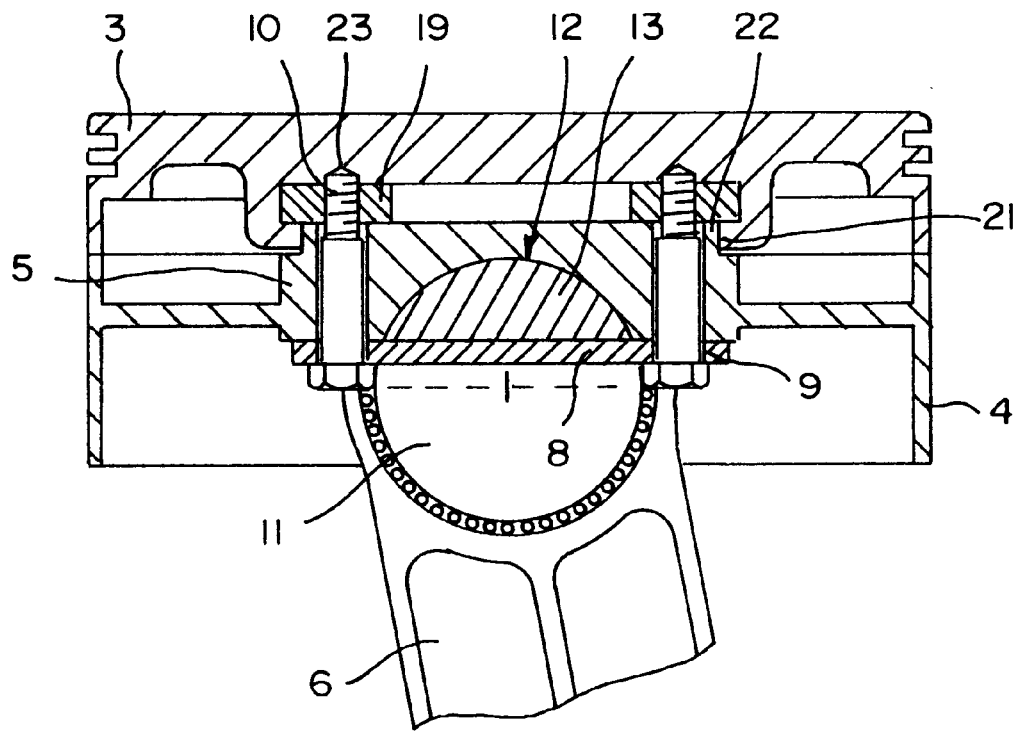
FIG. 3 is a sectional view taken through line B—B across the threaded members.
Figure 4:
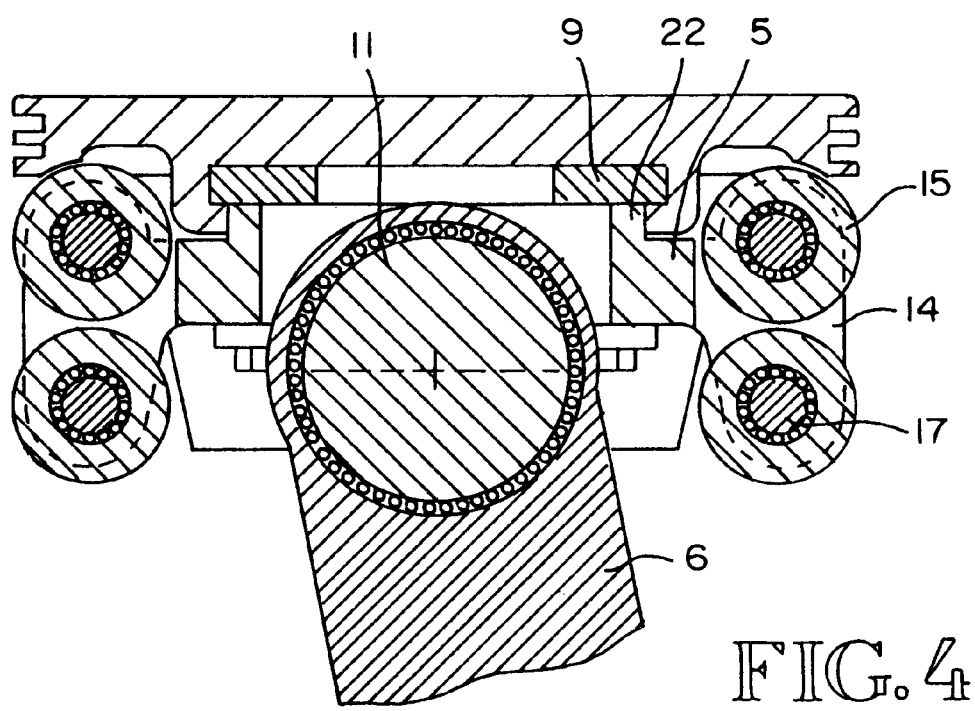
FIG. 4 illustrates an embodiment as set forth in claim 2.
Figure 5:
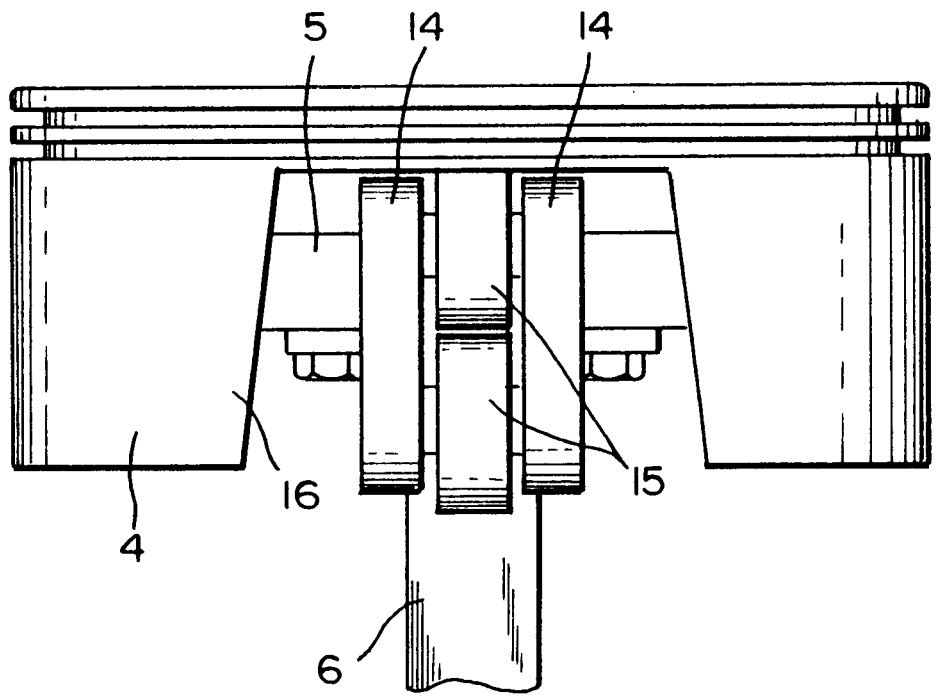
FIG. 5 is a side view of the embodiment shown in FIG. 4.

Referring now to the drawings in detail, a connecting rod and piston assembly for an internal combustion engine comprises a piston 2 having a head 3, a skirt 4 and a support member 5, the piston 2 being arranged within a cylinder 1 and connected with a connecting rod 6 through a piston pin 7. The assembly further comprises fixing plates 8 with openings 9, and threaded members 10. The connecting rod 6 is installed on a central cylindrical portion 11 of the piston pin 7. The surface of the support member 5, remote from the head 3, is provided with grooves 12 having open cylindrical surfaces. Ends 13 of the piston pin 7 are made in the form of semi-cylindrical elements that are coaxial to the central portion 11 and have planar surfaces parallel to the longitudinal axis of the pin 7, the ends 13 being located within the grooves 12 and mating the groove surfaces. The plates 8 lie against the planar surfaces of the ends 13 of the piston pin 7 and contact the surfaces, the threaded members 10 being disposed within the openings 9 symmetrically about the axis of the pin 7, and the ends 13 are urged to the head 3 by the threaded members 10.

The support member 5 can be made in the form of a carriage with Y-shaped bearings 14 and rolling members 15 disposed in the rocking plane of the connecting rod 6 at both sides of the piston pin 7, the skirt 4 of the piston 6 has cutouts 16 housing the rolling members 15 mounted on shafts 17 in the Y-shaped bearings 14 so that to contact the cylinder 1 wall.

At least one pair of the rolling members 15 can be mounted at one side of the piston pin 7.

The shafts 17 of the pair of rolling members 15 can be arranged in parallel.

A distance between the rotation axes of the pair of rolling members 15 may be less than a diameter of the rolling members.

One of the pair of rolling members 15 may be provided with a radial annular recess 18 to receive the other member.

The assembly can be provided with embedded nuts made in the form of ring segments 19, the head 3 having radial grooves in the form of an inner annular bore 20 arranged in the plane parallel to the longitudinal axis of the piston pin 7.

The larger diameter annular surface part of the segments 19 may be arranged within the annular bore 20, while the other part of the segments 19 mates the surface of the support member 5 and is urged thereto by the threaded members 10.

The head 3 can be provided with a coaxial centering cylindrical bore 21 of less diameter than the annular bore 20, the support member 5 being provided with a centering flange 22 mating the cylindrical surface of the centering boring 21.

At the side of the support member 5, the head 3 can be provided with blind holes 23 that receive the ends of the threaded members 10, protruding beyond the surface of ring segments 19.

The diameter of the central cylindrical portion 11 of the piston pin 7 can exceed the diameter of the cylinder segments of its ends 13.

The connecting rod and piston assembly in accordance with the present invention operates in the following manner. The work of the gas expanded within the cylinder 1 of the internal combustion engine is transmitted via the head 3, ring segments 19 of the embedded nuts, the support member 5, the piston pin 7, the connecting rod 6 and further to the output shaft (nor shown).

In two-stroke engines, the piston pin 7 and the connecting rod 6 experience only a one-sided compressive load from the head 3 of the piston 2. Therefore, owing to making the ends 13 of the piston pin 7 in the shape of semi-cylindrical elements which are in shear in the region of the central portion 11 and pressed by relatively small plates 8, the overall dimensions and weight of the piston assembly can be reduced. Making the diameter of the central portion 11 as large as possible allows the reduction in the width of the connecting rod 6, and the operating conditions of the piston pin 7 can be essentially improved due to substantial elimination of the effect of bending loads. The increased diameter of the ends 13 of the piston pin 7 allows the reduction in the height of the ends 13 at the same load-carrying capacity which is essential for two-stroke engines with the crank case blowoff.

The presence, in the piston 12, of the rolling members 15 contacting the cylinder 1 wall provides the reduction in friction forces in the cylinder and piston assembly by the order of magnitude, and, consequently, makes it possible to reduce the length of the connecting rod 6 and to move the piston 2 closer to the shaft (not shown), providing lesser overall dimensions and weight and the idle space in the crank case (not shown).

Additionally, the presence of the rolling members 15 ensures the drastic reduction in the stalling torque caused by the friction force in the cylinder and piston assembly, and, hence, the reduction in the height of the skirt 4 of the piston 2.

Figure 6:
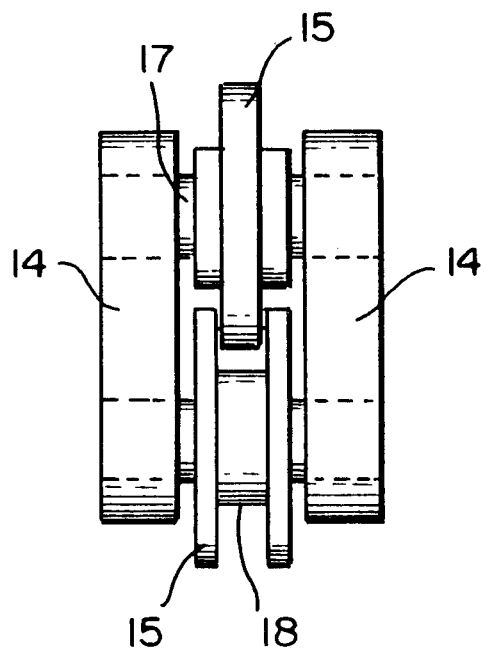
FIG. 6 illustrates an embodiment of a pair of rolling members as set forth in claim 6.

The reduced distance between the rotation axes of the members 15 (see FIG. 6) makes it possible to increase the diameter of the members 15 and improve operation conditions at the same height of the piston 2.

The attachment of the support member 5 and the pin 7 by the ring segments (nuts) 19 eliminates additional local stresses caused by tightening the threaded members 10 in the thermally loaded head 3 and obviates the problems connected with sealing the holes for the threaded members. Owing to the single-sided effect of the loads in a two-stroke engine, the assembly can be made quite space-saving and light weight.

Therefore, a connecting rod and piston assembly in accordance with the invention provides the possibility of minimizing the height of the piston 2 and the distance between the piston 2 and the shaft (not shown) owing to the reduction in the length of the connecting rod 6, the height of the skirt 4 of the piston 2 and the height of the support member 5 with the piston pin 7 attached thereto. Taken together, these effects ensure the essential reduction in the entire assembly weight and the radial dimensions of the engine per se.

The present invention also allows the employment of various materials for fabrication of the head and the support member, provides more convenient assembling of the piston pin with the connecting rod and the support member, in particular, when a needle bearing is provided between them, and makes it possible to eliminate lateral openings in the skirt (it mostly pertains to the embodiment without the rolling members) to pass the pin in assembling.

It should be noted that the employment of the present invention in a two-stroke engine with the crank case blowoff, missing gas distribution valves which in the majority of cases increase the engine radial dimensions, will allow the substantial reduction in the engine specific weight due to the reduced metal content and the improved gas dynamic processes provided by the reduced idle space in a crank case.

Industrial Applicability

The present invention can be employed in designing engines, in particular, in designing and manufacturing internal combustion engines, and allows the essential reduction in the engine weight and dimensions, providing more reliable engines.

What is claimed is:

1. A connecting rod and piston assembly for an internal combustion engine, comprising a piston having a head, a skirt and a support member, said piston being arranged in a cylinder and connected to a connecting rod through a piston pin, the connecting rod being installed on a central cylindrical portion of the piston pin, a surface of the support member, remote from the head, being provided with grooves having open cylindrical surfaces, ends of the piston pin being arranged within the grooves, mating the groove surfaces, and urged to the head by threaded members, wherein said assembly further comprises fixing plates with openings in them, the ends of the piston pin being made in the form of semi-cylindrical elements which are coaxial to the central portion and have planar surfaces parallel to the longitudinal axis of the piston pin, the plates lying against the planar surfaces of the piston pin ends and contacting them, and the threaded members being arranged in the openings in the fixing plates symmetrically about the piston pin axis.

2. A connecting rod and piston assembly as set forth in claim 1, wherein the support member is made in the form of a carriage with Y-shaped bearings and rolling members arranged in the rocking plane of the connecting rod at both sides of the piston pin, the skirt being provided with cutouts receiving the rolling members mounted on shafts in the Y-shaped bearings and in contact with the cylinder wall.

3. A connecting rod and piston assembly as set forth in claim 2, wherein at least one pair of the rolling members is provided at one side of the piston pin.

4. A connecting rod and piston assembly as set forth in claim 3, wherein the shafts of the pair of rolling members are arranged in parallel.

5. A connecting rod and piston assembly as set forth in claim 4, wherein a distance between the rotation axes of the pair of rolling members is less than a diameter of the rolling members.

6. A connecting rod and piston assembly as set forth in claim 5, wherein one of the rolling members in said pair has a radial annular recess to receive the other rolling member.

7. A connecting rod and piston assembly as set forth in claim 1, comprising embedded nuts, the head being provided with radial grooves into which the threaded members are screwed.

8. A connecting rod and piston assembly as set forth in claim 7, wherein the radial grooves are made in the form of an inner annular bore arranged in the plane parallel to the longitudinal axis of the piston pin, the nuts being made in the form of ring segments.

9. A connecting rod and piston assembly as set forth in claim 8, wherein a larger diameter annular surface part of nuts is disposed within the annular bore, the other part mating the support member surface and being urged thereto by the threaded members.

10. A connecting rod and piston assembly as set forth in claim 8, wherein the head has a coaxial centering cylindrical bore of lesser diameter than the annular bore, the support member having a centering flange mating the cylindrical surface of the centering bore.

11. A connecting rod and piston assembly as set forth in claim 8, wherein the head, at the side of the support member, has blind holes receiving the ends of the threaded members that protrude beyond the surface of the embedded nuts.

12. A connecting rod and piston assembly as set forth in claim 1, wherein a diameter of the central cylindrical portion of the piston pin exceeds a diameter of the cylinder segments.

* * * * *